United States Patent [19]

Ohtsu et al.

[11] 3,815,192

[45] June 11, 1974

[54] THROW AWAY INSERT

[75] Inventors: Yasuo Ohtsu; Seiji Nakatani; Hiroshi Fukura, all of Itami, Japan

[73] Assignee: Sumitomo Electric Industries, Ltd., Osaka, Japan

[22] Filed: Feb. 15, 1973

[21] Appl. No.: 332,729

[30] Foreign Application Priority Data
Feb. 26, 1972 Japan.......................... 47-23720

[52] U.S. Cl................................................ 29/95 R
[51] Int. Cl.............................................. B26d 1/00
[58] Field of Search................................. 29/95, 96

[56] References Cited
UNITED STATES PATENTS
2,713,714   7/1955   Krause............................... 29/95 R
3,407,467  10/1968   Wirfelt............................... 29/95 R Primary Examiner—Leonidas Ylachos
Attorney, Agent, or Firm—Kurt Kelman

[57] ABSTRACT

A polygonal throw away insert to be detachably mounted in a tool holder having a plurality of cutting edges on one major surface of the insert body along the edges of all the sides thereof and a plurality of projection rows provided on said major surface along and spaced from the cutting edges so as to form chip breakers. Adjacent projections in each projection row define chip curling zones therebetween.

10 Claims, 14 Drawing Figures

THROW AWAY INSERT

BACKGROUND OF THE INVENTION

This invention relates to a polygonal throw away insert to be detachably mounted in a tool holder and, more particularly, to a polygonal throw away insert to be detachably mounted in a tool holder having a plurality of cutting edges on one major surface of the insert body along the edges of all the sides thereof and a plurality of projection rows on the same major surface along and spaced from the cutting edges so as to define chip curling zones therebetween.

When continuous chips are generated such as when a steel work piece is cut such as by a lathe, in order to make the cutting operation easy and enhance the machining efficiency of the lathe, it has been known that the generated chips are required to be discharged in a curled or broken state and that the radius of curvature of the curl in the chips is preferably suitably controlled in conformity with the thickness of the chips. For the purposes, the prior art turning tools have conventionally employed throw away inserts which are made of cemented carbide and have cutting edges on one or two major surfaces of themselves. Such an insert is further provided with grooves along the cutting edges (such grooves are generally referred to as "chip breakers") and the width and radius of curvature of the chip breaker grooves determine the radius of curvature of generated chips.

However, in such a prior art throw away insert, since the width and radius of curvature of the chip breaker of the insert are fixed and not adjustable, the insert only can cover a very limited range of feed rates and therefore, many kinds of inserts which have differently sized and shaped chip breakers must be employed to meet with a wide extent of feed rates. For example, when the chip breakers of the insert have a relatively small width or radius of curvature, the produced chips will have a curl of relatively small radius of curvature. Therefore, although such an insert may be suitably employed when the feed rate is relatively small, this insert is not suitable for a turning in which the feed rate is relatively great because the produced chips come to have a curl of improperly small radius of curvature for their great thickness. On the other hand, a throw away insert the chip breakers of which have a relatively great width or radius of curvature is employed, the generated chips will have a relatively great radius of curvature accordingly, and therefore, although such an insert may be suitably employed when the feed rate is relatively great, the insert is not suitable for a turning in which the feed rate is relatively small because the produced chips will have a curl of improperly great radius of curvature for their small thickness.

Furthermore, the prior art throw away cutter insert having the groove type chip breakers provides a relatively large contact area with respect to the generated chips and in consequence, the insert will be easily subjected to thermal wear or damage resulting in shortening the tool life of the insert.

SUMMARY OF THE INVENTION

Therefore, one principal object of the present invention is to provide a novel and improved throw away insert which can be suitably and effectively employed for cutting operations with different feed rates.

Another object of the present invention is to extend the tool life of such a throw away insert by decreasing its contact area with generated chips thereby to reduce thermal wearing of the insert which is otherwise inevitable.

The objects of the present invention will be attained by providing a polygonal throw away insert to be detachably mounted in a tool holder having a plurality of cutting edges on one major surface of the insert body along the edges of all the sides thereof, a corresponding number of ramps which slope gradually and downwardly from said cutting edges toward the center of the insert body and a plurality of chip breaker projection rows each row including a plurality of chip breaker projections positioned on or adjacent the downstreams of said ramps in substantially parallel to said cutting edges thereby to define chip curling zones between adjacent projections.

BRIEF DESCRIPTION OF THE DRAWINGS

The above and other objects and attendant advantages of the present invention will be more readily apparent to those skilled in the art from a reading of the following detailed description in conjunction with the accompanying drawings wherein:

FIGS. 1A through 1C inclusive show one typical type of prior art throw away grooved insert for use for turning and in which FIG. 1A is a plan view of the insert, FIG. 1B is a wide elevational view of the insert and FIG. 1C is a fragmentary cross-sectional view on an enlarged scale of the insert taken along the line A — A of FIG. 1A;

FIGS. 2A and 2B show the conditions of chips produced from a work piece when the work piece is cut by a prior art throw away insert having a relatively small radius of curvature chip breaker and in which FIG. 2A shows the condition of a relatively thin chip produced by the throw away insert having such small radius of curvature chip breaker and FIG. 2B shows the condition of a relatively thick chip produced by the same throw away insert which produced the chip as shown in FIG. 2A;

FIGS. 3A and 3B show the conditions of chips produced from a work piece when the work piece is cut by another prior art throw away insert having a relatively large radius of curvature chip breaker and in which FIG. 3A shows the condition of a relatively thin chip produced by the throw away insert having such large radius of curvature chip breaker and FIG. 3B shows the condition of a relatively thick chip produced by the same throw away insert which produced the chip as shown in FIG. 3A;

FIGS. 5A and 5B show the conditions of chips produced from a work piece when the work piece is cut by the throw away insert of FIGS. 4A – 4E inclusive of the invention and in which FIG. 5A shows the condition of a relatively thin chip produced by the insert of the invention and FIG. 5B shows the condition of a relatively thick chip produced by the same insert.

PREFERRED EMBODIMENT OF THE INVENTION

Figure 1A:
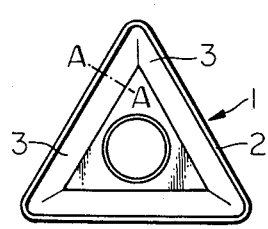

The present invention will be now described referring to the accompanying drawings which illustrate one typical prior art throw away insert and one preferred embodiment of polygonal throw away insert of the invention for comparison purpose only.

First, reference will be made on FIGS. 4A through 4E which show a regular triangle throw away insert embodying the present invention. The throw away insert of the invention is generally shown with reference numeral 10 and has on one major surface thereof a plurality of cutting edges 11 extending along all the edges of the three sides of the triangle and projecting upwardly of the major surface so as to define a recess 16 in the surface having a preselected depth and surrounded by the cutting edges in a spaced relationship thereto. The areas between the bottom of the recess 16 and the cutting edges 11 slope down with a gentle slope towards the center of the recess extending along all the cutting edges so as to provide ramps 12 (the ramps may be straight instead of the curved slope as shown). A plurality of projections 14 and 13 are provided on the ramps 12 or more particularly, on the downstreams of the ramps in a position spaced inwardly off the cutting edges 11 or noses 15 of the cutting edges 11 at the three corners of the triangle. Each of the projections 13 has its center positioned on the bisector which bisects the angle of intersection between each two adjacent sides of the triangle and has the top having substantially the same height as the cutting edges 11. Provided between each two corner projections 13 are a plurality of second projections 14 arranged in a row in a predeterminedly spaced relationship therebetween and to the projections 13 respectively. The second projections 14 may have substantially the same height as or slightly lower than the first-mentioned projections 13. The rows of the second projections 14 are preferably arranged in a symmetrical relationship with respect to the side center of the insert and also preferably spaced from the adjacent cutting edges 11 by the distance range from 1 mm to 3 mm. Furthermore, the distance between the centers of each two adjacent projections 14 is preferably within the distance range from 2 mm to 4 mm. Although each projection row including two corner projections 13 and a greater number of second projections 14 (five second projections 14 in the illustrated embodiment) is shown as deviating a little from the parallelism with respect to the alongside cutting edges 11 as in FIG. 4A, the projection rows may be arranged in substantially parallel to the cutting edges 11 without departing the scope of the invention.

Although the projections 13 and 14 are preferably in the form of a portion of a sphere, the projections may have other shapes. The bases of these projections preferably merge smoothly into the body of the insert with a gentle curve.

Figure 5A:
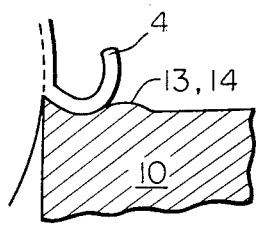
Figure 5B:
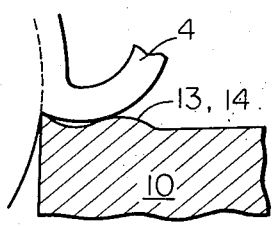

Referring now to FIGS. 5A and 5B of the accompanying drawings which show the conditions of chips having different thicknesses produced by the throw away insert of the invention. As shown in FIG. 5A, when the feed rate is relatively small resulting in the generation of a chip 4 having a relatively small thickness, such a chip 4 will advance downwardly along the ramp 12 until the chip encounters one of the projections 13 or 14 whereupon the chip then curves upwardly along the flank of the particular projection to curl itself upwardly. In other words, when the produced chip has a relatively small thickness, the chip is caused to curl itself in full contact with the ramp 12 in a position between the cutting edge 11 and a particular projection 13 or 14 and as a result, the curl in the chip will have a relatively small radius of curvature. On the other hand, when the feed rate is great resulting in the generation of a chip having a relatively great thickness as shown in FIG. 5B, the chip will advance in only partial contact with the ramp 12, but not in full contact with the ramp as in the case of the thin chip until the chip encounters one of the projections 13 and 14 in contact with only the upper portion of the particular projection to curl itself. As a result, the chip will have a relatively great radius of curvature which is greater than that of the curl in the chip as shown in FIG. 5A. Thus, it will be understood that by the use of the throw away insert of the invention, the radius of curvature of the curl in a chip produced may vary depending upon the thickness of the chip and that since the radius of curvature of the curl in a produced chip can vary depending upon the feed rate, the throw away cutting insert of the invention can be employed for turning in a wide variety of feed rates.

Figure 1B:
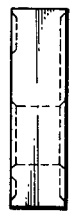
Figure 1C:
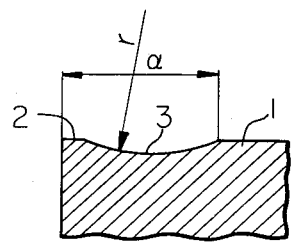

In contrast with the prior art throw away insert having groove type chip breakers as shown in FIGS. 1A through 1C which necessitates to choose properly the depth and/or the width of the groove in relation to the feed rate to be applied according to the present invention, the throw away insert is provided with the projections along the cutting edges in place of the groove type chip breakers so that the insert of the invention can be employed in various different cutting conditions.

Figure 2A:
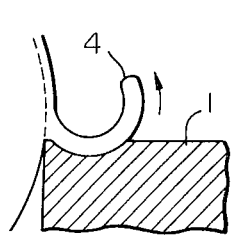
Figure 2B:
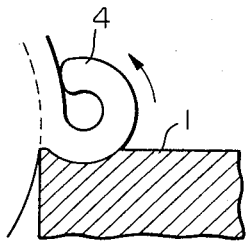
Figure 3A:
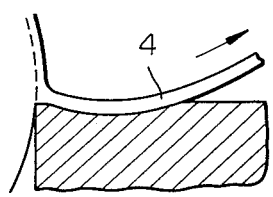
Figure 3B:
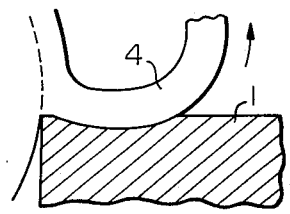
Figure 4A:
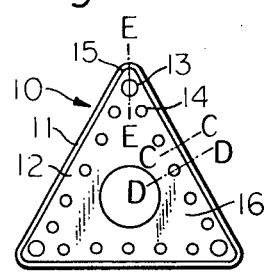
FIG. 4A is a plan view of one embodiment of polygonal throw away insert constructed in accordance with the present invention.
Figure 4B:
FIG. 4B is a side elevational view of said insert as shown in FIG. 4A.
Figure 4C:
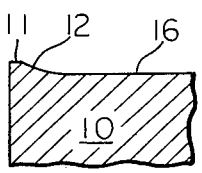
FIG. 4C is a fragmentary cross-sectional view on an enlarged scale taken along the line C — C of FIG. 4A.
Figure 4D:
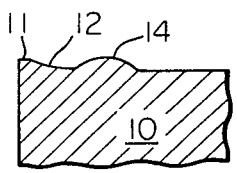
FIG. 4D is a fragmentary cross-sectional view on an enlarged scale taken along the line D — D of FIG. 4A.
Figure 4E:
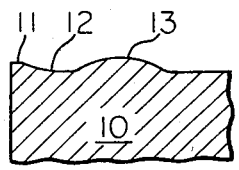
FIG. 4E is a fragmentary cross-sectional view on an enlarged scale taken along the line E — E of FIG. 4A.

To better understanding of the throw away insert of the present invention over the prior art throw away inserts having groove type chip breakers, reference will be made on FIGS. 1A through 2B inclusive. In a turning by tool holder having the prior art insert 1 provided with cutting edges 2 including chip breakers 3 of relatively small width α and radius of curvature γ more clearly shown in FIG. 1C, when the insert cuts into a work piece with a relatively small feed rate to produce a chip 4 having a relatively small thickness. As shown in FIG. 2A, the chip will curl itself having a suitable radius of curvature. On the other hand, when the same insert cuts into a work piece with a relatively great feed rate to produce a chip having a relatively great thickness, the produced thick chip 4 will have an improperly small radius of curvature for the thickness of such chip to the degree that the chip can not be smoothly discharged out of the cutting edge. Furthermore, when the chip breaker 3 of relatively great width α and radius of curvature curl γ as shown in FIGS. 3A and 3B is employed, in opposition to the case of the prior art throw away insert as shown in FIGS. 1A through 2B inclusive, if the insert cuts into a work piece with a great feed rate to produce a chip of relatively great thickness, the obtained chip will curl itself having a proper radius of curvature for its thickness. However, when such a prior art throw away insert cuts into a work piece with a relatively small feed rate to produce a relatively thin chip, the chip will have an improperly great radius of curvature for its thickness to the degree that the chip will not curl itself at all but is discharged in a substantially straight form as shown in FIG. 3A and in consequence, the cutting operation by the throw away insert will be troubled.

Properties of the throw away insert of the invention and those of the prior art throw away inserts having groove type chip breakers will be compared with each other as follows:

A. Curling comparison of inserts under a small feed rate:
 Work piece — SCM3 (a wrought alloy steel having the composition comprising 0.33 – 0.38 percent of C, 1.5 – 0.35 percent of Si, 0.6 – 0.85 percent of Mn, about 0.030 percent of P, about 0.030 percent of S, about 0.35 percent of Cu, about 0.3 percent of Ni, 0.90 – 1.20 percent of Cr and about 0.15 – 0.35 percent of Mo)
 Cutting rate — 100 m/min
 Feed rate — 0.1 mm per revolution
 Entering depth — 1 – 2 mm The chips produced by the prior art throw away inserts did not curl themselves, but remained in a substantially straight form which would result in hindering the cutting operation. On the contrary, the chips produced by the throw away insert of the invention suitably curled themselves into a coiled form.

B. Curling comparison of inserts under a large feed rate:
 Work piece — SCM3
 Cutting rate — 100 m/min
 Feed rate — 0.6 mm per revolution
 Cutting depth — 3.5 mm The chips produced by the prior art throw away inserts having groove type chip breakers curled themselves having an extremely small radius of curvature to the degree that they clogged up between the work surface and the work surface of the inserts and were discharged flingingly about. On the other hand, the chips produced by the throw away insert of the invention curled themselves with a suitable radius of curvature and can be smoothly discharged.

C. Comparison of tool life of throw away inserts:
 Work piece — SK5 (a wrought alloy steel having the composition comprising 0.84 percent of C, 0.18 percent of Si, 0.32 percent of Mn, 0.010 percent of P, 0.004 percent of S, 0.11 percent of Ni and 0.09 percent of Cr)
 Cutting rate — 130 m/min
 Feed rate — 0.34 mm per revolution The rake surfaces of the prior art throw away inserts wore to the limiting crater depth after 5 minutes of consecutive turning. On the other hand, the throw away insert of the invention was serviceable for 8 minutes of consecutive cutting.

As clear from the foregoing, according to the present invention, since curling zones are defined between the projections 13 and/or the projections 14, produced chips of small thickness will curl themselves as they advance along the curling zones whereas produced chips of great thickness pass in succession through the recesses while abrading the tops of the projections to gradually reduce the height of the projections whereby the chips are allowed to curl themselves smoothly and therefore, the throw away inserts of the invention can be employed for various cutting conditions regardless of the feed rate to be applied. And since there is a very small contact area between the throw away insert and chips (in case of a great feed cutting, the chips will not contact the entire curling zone or zones, but bridge between the cutting edge and projections and curl themselves there), the chips will be subjected to a relatively small resistance thereby to reduce the cutting resistance. Furthermore, since the contact area between the chips and insert is small, the insert will be subjected to a relatively small degree of thermal wear thereby to extend the tool life of the throw away insert.

Although the throw away insert of the invention is shown as having a regular triangle configuration, the insert may be in other polygonal configurations such as square, diamond or other polygonal configurations or any circular configuration without departing of the scope of the invention.

The present invention has been described thus far referring to preferred embodiments thereof in connection with the drawings. It must be, however, understood that the present invention is not limited to the embodiments described and illustrated herein but broadly covers all the variations and modifications without departing from the spirit and the scope of the present invention defined in the appended claims.

What is claimed is:

1. A polygonal throw away insert to be detachably mounted in a tool holder having opposite and parallel two major surfaces and a plurality of sides, said insert comprising a plurality of cutting edges on one of said major surfaces along the edges of all the sides of the insert body, a corresponding number of ramps which slope gradually and downwardly from said cutting edges toward the center of said insert body and a plurality of chip breaker projection rows each row including a plurality of chip breaker projections positioned on or adjacent the down-streams of said ramps in a spaced relationship to said cutting edges thereby to define chip curling zones between adjacent projections.

2. The polygonal throw away insert to be detachably mounted in a tool holder as set forth in claim 1, in which said rows of projections are positioned in substantially parallel to adjacent cutting edges.

3. The polygonal throw away insert to be detachably mounted in a tool holder as set forth in claim 1, in which each of said rows of projections extends in a slightly curved line with the projections in the center of said line positioned nearer to the center of said insert body than the rest in the same line positioned with respect to the body center.

4. The polygonal throw away insert to be detachably mounted in a tool holder as set forth in claim 1, in which said ramps have the surface of a preselected curvature.

5. The polygonal throw away insert to be detachably mounted in a tool holder as set forth in claim 1, in which said ramps have the surface of a linear plane.

6. The polygonal throw away insert to be detachably mounted in a tool holder as set forth in claim 1, in which said insert body has a triangle configuration.

7. The polygonal throw away insert to be detachably mounted in a tool holder as set forth in claim 1, in which said projections have substantially the same height as said cutting edges.

8. The polygonal throw away insert to be detachably mounted in a tool holder as set forth in claim 1, in which said projections are in the form of a portion of a sphere.

9. The polygonal throw away insert to be detachably mounted in a tool holder as set forth in claim 1, in which the distance between two adjacent projections in each row is within the range of 2 mm to 4 mm.

10. The polygonal throw away insert to be detachably mounted in a tool holder as set forth in claim 1, in which each of said rows of projections is spaced from the adjacent cutting edge within the range of 1 mm to 3 mm.

* * * * *